United States Patent
Wieting et al.

(10) Patent No.: US 6,932,211 B2
(45) Date of Patent: Aug. 23, 2005

(54) MODULAR CONVEYING ASSEMBLY WITH STUB MOUNTED IN-LINE ROLLERS

(75) Inventors: Dean A. Wieting, Milwaukee, WI (US); Kevin S. Hansen, Grafton, WI (US)

(73) Assignee: Rexnord Industries, Inc., Milwaukee, WI (US)

( * ) Notice: Subject to any disclaimer, the term of this patent is extended or adjusted under 35 U.S.C. 154(b) by 0 days.

(21) Appl. No.: 10/790,482

(22) Filed: Mar. 1, 2004

(65) Prior Publication Data

US 2005/0126896 A1 Jun. 16, 2005

Related U.S. Application Data

(60) Provisional application No. 60/529,557, filed on Dec. 15, 2003.

(51) Int. Cl.[7] .............................................. B65G 17/06
(52) U.S. Cl. ...................................... 198/853; 198/845
(58) Field of Search ............................... 198/779, 838, 198/850–853, 845

(56) References Cited

U.S. PATENT DOCUMENTS

| | | |
|---|---|---|
| 1,377,450 A | 5/1921 | Whipple |
| 1,641,642 A | 9/1927 | Pangbom |
| 3,082,861 A | 3/1963 | Kornylak |
| 3,550,756 A | 12/1970 | Kornylak |
| 3,964,588 A | 6/1976 | Kornylak |
| 4,231,469 A | 11/1980 | Arscott |
| D289,734 S | 5/1987 | Schroeder et al. |
| D299,424 S | 1/1989 | Schroeder et al. |
| D299,425 S | 1/1989 | Schroeder et al. |
| 4,821,869 A | 4/1989 | Hodlewsky |
| 4,880,107 A | 11/1989 | Deal |
| 4,909,380 A | 3/1990 | Hodlewsky |
| 4,925,016 A | 5/1990 | Lapeyre |
| 4,993,540 A | 2/1991 | van Capelleveen |
| 5,096,050 A | 3/1992 | Hodlewsky |
| 5,224,583 A | 7/1993 | Palmaer et al. |
| 5,238,099 A | 8/1993 | Schroeder et al. |
| 5,261,525 A | 11/1993 | Garbagnati |
| 5,330,045 A | 7/1994 | Hodlewsky |

(Continued)

FOREIGN PATENT DOCUMENTS

DE 20 45 899 A 3/1972

*Primary Examiner*—Eileen D. Lillis
*Assistant Examiner*—Mark A. Deuble
(74) *Attorney, Agent, or Firm*—Quarles & Brady LLP

(57) ABSTRACT

A modular conveying assembly includes a conveyor belt module for use with in-line rollers. The module includes first and second hinge member. The first hinge member extends forwardly in the direction of conveyor travel, and includes a first opening defining a first space extending along an axis transverse to the direction of conveyor travel for receiving a first hinge pin. The second hinge member extends in a direction opposite to the first hinge member, and includes a second opening defining a second space extending along an axis transverse to the direction of conveyor travel for receiving a second hinge pin. A stub extends from the first hinge member transverse to the direction of conveyor travel, and surrounds at least a portion of the first space for rotatably mounting a roller thereon for rotation around the first space.

21 Claims, 3 Drawing Sheets

U.S. PATENT DOCUMENTS

| | | |
|---|---|---|
| 5,404,997 A | 4/1995 | Schreier et al. |
| 5,489,020 A * | 2/1996 | Clopton ............... 198/851 |
| 5,706,934 A | 1/1998 | Palmaer et al. |
| 5,746,305 A * | 5/1998 | Wilkins et al. .......... 198/890.1 |
| 6,044,956 A | 4/2000 | Henson et al. |
| 6,148,990 A | 11/2000 | Lapeyre et al. |
| 6,209,714 B1 | 4/2001 | Lapeyre et al. |
| 6,364,095 B1 * | 4/2002 | Layne et al. ............ 198/852 |
| 6,367,616 B1 | 4/2002 | Lapeyre et al. |
| 6,398,015 B1 | 6/2002 | Sedlacek et al. |
| 6,494,312 B2 | 12/2002 | Costanzo |
| 6,527,106 B2 * | 3/2003 | Tanabe et al. .............. 198/853 |
| 2001/0045346 A1 | 11/2001 | Costanzo |
| 2002/0020609 A1 | 2/2002 | Lapeyre et al. |

* cited by examiner

MODULAR CONVEYING ASSEMBLY WITH STUB MOUNTED IN-LINE ROLLERS

CROSS REFERENCES TO RELATED APPLICATIONS

This application claims the priority benefit of U.S. provisional Patent Application No. 60/529,557 filed on Dec. 15, 2003.

STATEMENT REGARDING FEDERALLY SPONSORED RESEARCH

Not Applicable.

BACKGROUND OF THE INVENTION

The present invention relates to modular conveyor belts and chains, and more particularly to a conveyor module having in-line rollers and a modular conveying assembly including at least one of the conveyor modules.

Modular belting and chains are formed from interconnected modules that are supported by a frame and driven to transport a product. Each module has a support surface which supports the product as the belting or chain is being driven along the frame. Adjacent modules are connected to each other by hinge pins inserted through hinge members extending from adjacent modules in the direction of the belt travel.

Modular belts can transport products in the direction of conveyor travel, but have difficulty accumulating a product to reduce back-line pressure. In addition, high friction products can easily damage the belt if the product is accumulated. One known solution to this problem is to rotatably mount rollers directly on the hinge pin connecting modules together, such that the hinge pin supports the rollers between hinge members. The roller rotates about an axis of rotation that is substantially coaxial with the hinge pin axis. Because it is often desired to have a portion of the roller extend beyond (i.e. above and/or below) the module, the required roller diameter is determined by the hinge pin location and the height of the module. Unfortunately, this often results in requiring a large diameter roller that extends both above and below the module when that configuration is not always desired. Moreover, supporting the roller on the pin alone can result in undesirable pin wear.

Another known solution for reducing back-line pressure is disclosed in U.S. Pat. No. 4,231,469 issued to Arscott. In Arscott rollers are supported by roller cradles between modules. The rollers extend above the cradle for rolling contact with an object being conveyed independent of the location of the hinge pins. The rollers reduce friction between the belt and the object. Unfortunately, assembling the roller in the cradle is difficult, requiring insertion of the roller into the cradle, and then slipping an axle or two stub axles through holes formed through the cradle walls and into the roller. The axle must then be secured to prevent it from slipping out of one of the holes formed in the cradle wall.

SUMMARY OF THE INVENTION

The present invention provides a modular conveying assembly for minimizing damage to the belt and reducing back-line pressure when accumulating products. The modular conveying assembly includes a conveyor belt module for use with in-line rollers. The module includes first and second hinge member. The first hinge member extends forwardly in the direction of conveyor travel, and includes a first opening defining a first space extending along an axis transverse to the direction of conveyor travel for receiving a first hinge pin. The second hinge member extends in a direction opposite to the first hinge member, and includes a second opening defining a second space extending along an axis transverse to the direction of conveyor travel for receiving a second hinge pin. A stub extends from the first hinge member transverse to the direction of conveyor travel, and surrounds at least a portion of the first space for rotatably mounting a roller thereon for rotation around the first space.

A general objective of the present invention is to provide a belt module and a modular conveying assembly formed therefrom that can accumulate objects without severely damaging the objects or the assembly. This objective is accomplished by providing a stub that can support a roller that reduces friction between the object and the conveying assembly.

Another objective of the present invention is to provide a belt module that can support a roller independent of the hinge pin. This objective is accomplished by providing a stub that defines the roller axis of rotation independent of the hinge pin axis.

This and still other objectives and advantages of the present invention will be apparent from the description which follows. In the detailed description below, preferred embodiments of the invention will be described in reference to the accompanying drawing. These embodiments do not represent the full scope of the invention. Rather the invention may be employed in other embodiments. Reference should therefore be made to the claims herein for interpreting the breadth of the invention.

DETAILED DESCRIPTION OF PREFERRED EMBODIMENTS

Figure 1:
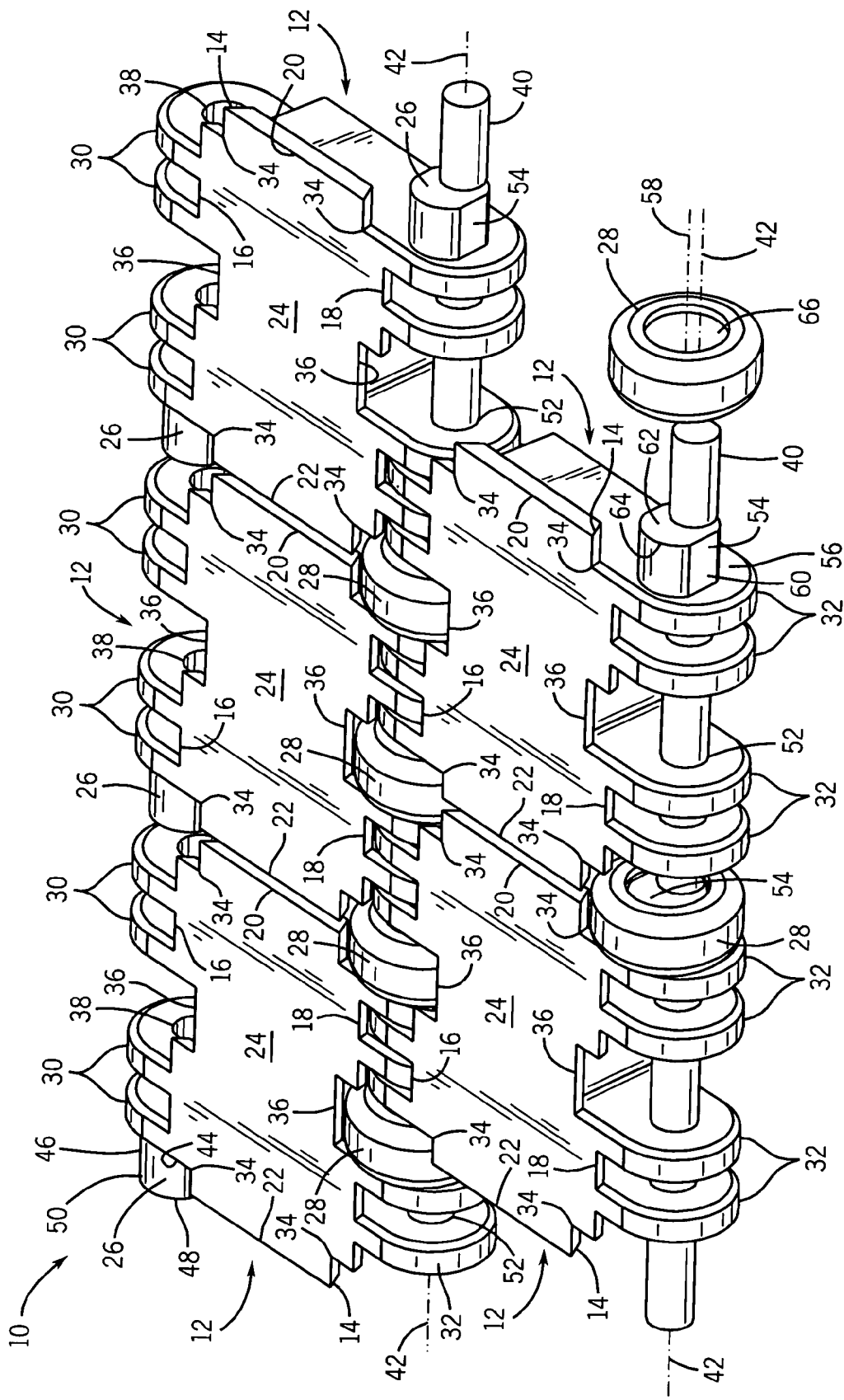
FIG. 1 is a perspective view of a modular conveyor belt incorporating the present invention.
Figure 2:
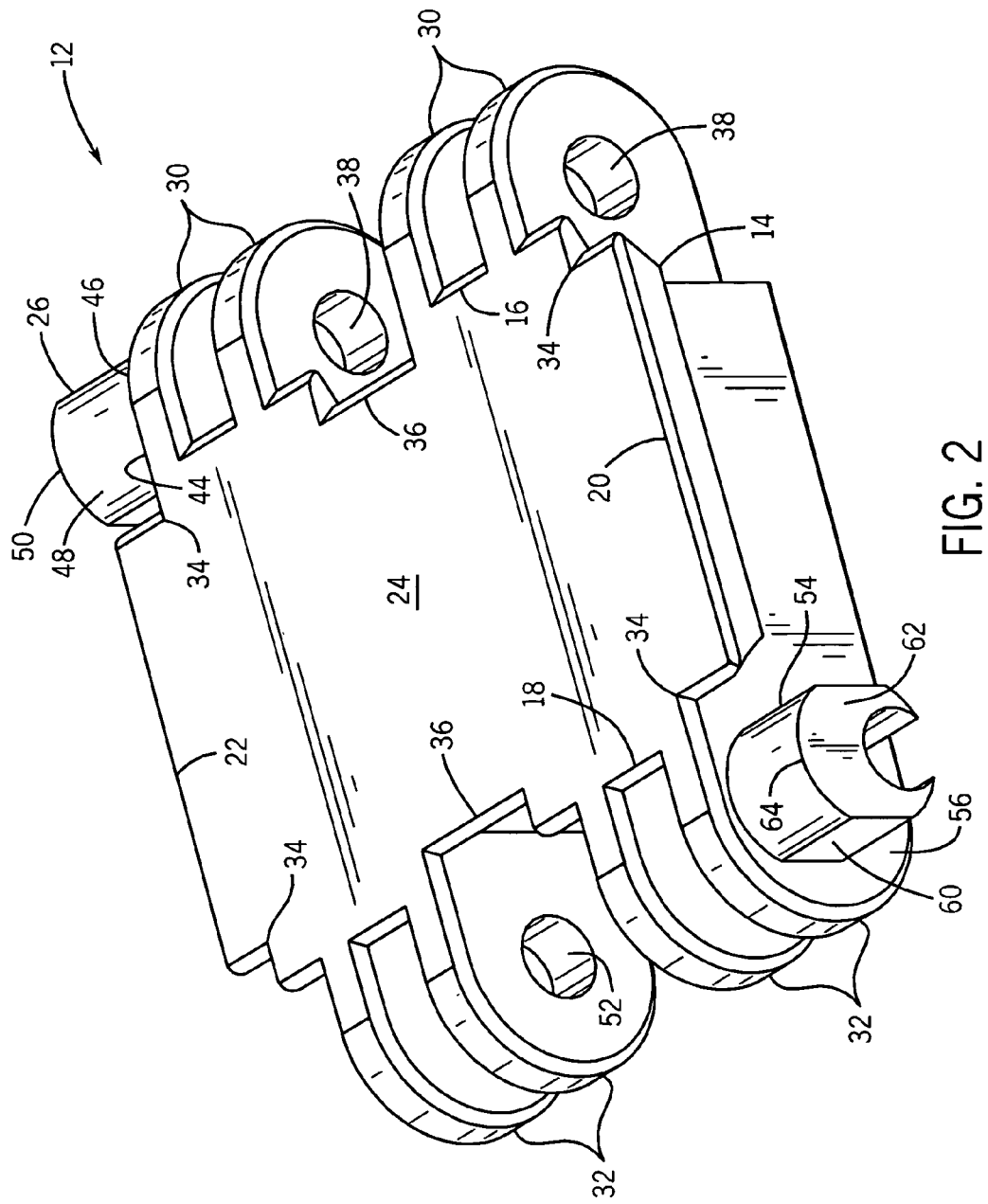
FIG. 2 is a perspective view of a module of FIG. 1.

A modular conveying assembly, or belt 10, shown in FIG. 1, includes a plurality of belt modules 12 assembled in an edge to edge relation to form the continuous belt 10. Hinge pins 40 join adjacent modules 12, and pivotally connect the adjacent modules 12 in the direction of belt travel. Stubs 26, 54 wrapping around at least a portion of the hinge pins 40 support in-line rollers 28 that rotatably engage an object being conveyed by the belt 10 to reduce friction between the belt 10 and the object. Advantageously, if the module 12 or roller 28 is damaged, only the damaged component need be replaced. Although, the terms "leading" and "trailing" are used to identify features of the module 12, the module 12 described herein can be used in any direction, or orientation without departing from the scope of the invention.

The modules 12 are preferably formed using methods known in the art, such as injection molding, from materials known in the art, such as acetal, polyethylene, polypropylene, nylon, and the like. Each module 12 includes a body 14 having a top surface 24 surrounded by a leading edge 16 and trailing edge 18 joined by a first side edge 20 and a second side edge 22. Advantageously, the top surface 24 can prevent products from falling through the belt 10. Of course, the top surface 24 can also have perforations to allow air or fluid flow for cooling, drafting, and/or draining. The module body 14 has a width which is defined by the distance between the side edges 20, 22, and a length which is defined by the distance between the leading and trailing edges 16, 18.

Notches 34, 36 formed in the edges 16, 18, 20, 22 define spaces between adjacent modules 12 for receiving the rollers 28 supported by the stubs 26, 54. Preferably, a corner notch 34 is formed in each corner of the module body 14 and a center notch 36 is formed in the leading and trailing edges 16, 18 between the side edges 20, 22 to allow assembling the modules in a "bricklaying" fashion. In the "bricklaying" fashion, a pair of corner notches 34 combine with a center notch 36 to define a single space between three adjacent modules 12 for receiving a roller 28 supported by one of the stubs 26, 54. Of course, the number, size, and location of notches is dependent upon the desired number, size, and location of rollers. Moreover, notches can be omitted from the module without departing from the scope of the invention.

Figure 3:
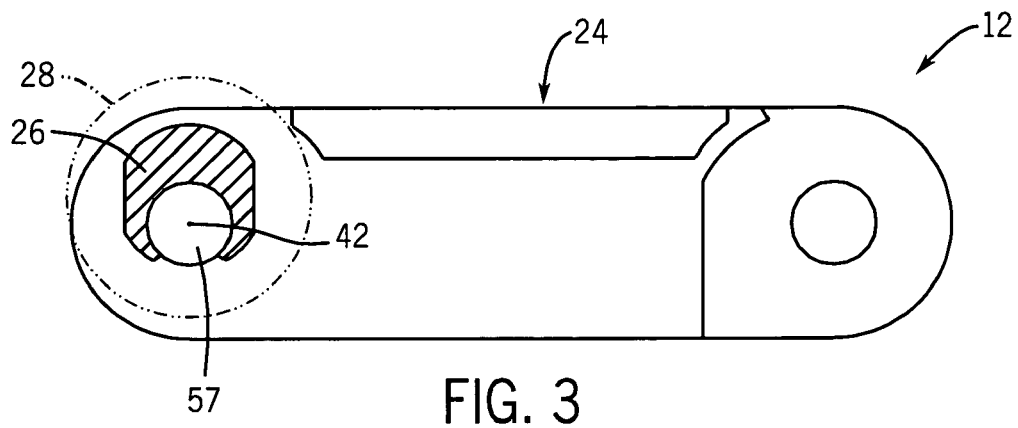
FIG. 3 is an elevational edge view of the module of FIG. 2.

Each leading edge hinge member 30 extends forwardly from the leading edge 16 of the module body 14, and includes a coaxial opening 38 for receiving the hinge pin 40. Each leading edge hinge member opening 38 defines a space 57 (shown in FIG. 3) extending along a hinge pin centerline axis 42 transverse to the direction of travel for receiving the hinge pin 40 pivotally connecting the leading edge hinge members 30 of one module 12 to trailing edge hinge members 32 of an upstream module 12.

A leading edge stub 26 extending from the leading edge hinge member 30 nearest the second side edge 22 of the module body 14 wraps at least partially around the hinge pin 40, and thus the space defined by the leading edge hinge member opening 38. The leading edge stub 26 extends in a transverse direction away from an outwardly transverse facing surface 44 of the leading edge hinge member 30 toward the nearest adjacent module 12 in the row, and supports a roller 28 which rotates about a roller axis of rotation that is offset above (i.e. toward the module top surface 24) the leading edge hinge pin axis 42. Advantageously, the leading edge stub 26 engages the roller 28 above the space defined by the leading edge hinge member opening 38 to raise the roller axis 58 of rotation above the hinge pin axis 42 so a portion of the roller 28 extends above the module top surface 24 for contact with the objects being conveyed. In addition, the stub 26 reduces wear on the hinge pin 40 caused by the rotating roller 28.

Preferably, the leading edge stub 26 extends from a proximal end 46 fixed to the leading edge hinge member 30 to a distal end 48. A radially extending lip 50 formed proximal the stub distal end 48 engages the roller 28 supported by the leading edge stub 26 to prevent the roller 28 from slipping axially off of the leading edge stub 26 as the belt 10 is being assembled.

Trailing edge hinge members 32 extending rearwardly from the trailing edge 18 also include coaxial openings 52. As in the leading edge hinge member openings 38, each trailing edge hinge member opening 52 defines an axially extending space coaxial with the hinge pin axis 42 transverse to the direction of travel. The trailing edge hinge pin openings 52 receive the hinge pin 40 pivotally connecting the trailing edge hinge members 32 of the module 12 to leading edge hinge members 30 of a downstream module 12.

A trailing edge stub 54 extending from the trailing edge hinge member 32 nearest the first side edge 20 of the module body 14 wraps at least partially around the hinge pin 40, and thus the space defined by the trailing edge hinge member opening 52. The trailing edge stub 54 extends in a transverse direction away from an outwardly transverse facing surface 56 of the trailing edge hinge member 32 in an opposite direction from the leading edge stub 26 toward the nearest adjacent module 12 in the row, and supports a roller 28 which rotates around the hinge pin 40, and thus the hinge pin axis 42 and the axially extending space 57 defined by the leading and trailing edge hinge member openings 38, 52. Advantageously, as in the leading edge stub 26, the trailing edge stub 54 engages the roller 28 above the space defined by the trailing edge hinge member opening 52 to raise the roller axis 58 of rotation above the hinge pin axis 42 so a portion of the roller 28 extends above the module top surface 24 for contact with the objects being conveyed.

Preferably, the trailing edge stub 54 extends from a proximal end 60 fixed to the trailing edge hinge member 32 to a distal end 62. A radially extending lip 64 formed proximal the stub distal end 62 engages the roller 28 supported by the trailing edge stub 54 to prevent the roller 28 from slipping axially off of the trailing edge stub 54 as the belt 10 is being assembled.

The rollers 28 support an object being conveyed by the belt 10, and allows movement of the object in the direction of conveyor travel to reduce back-line pressure. At least a portion of the roller 28 extends above the module top surface to engage the object being conveyed by the belt 10. Preferably, the roller 28 is molded from a plastic, and includes a throughhole 66 formed therethrough for receiving the hinge pin 40 and one of the stubs 26, 54. Advantageously, the roller 28 rotates around the hinge pin 40 to minimize friction between the belt 10 and object being conveyed and reduce the back-line pressure of objects accumulating on the belt 10. Although a plastic roller is disclosed, the roller can be formed from any material, such as elastomers, metals, and the like, suitable for the particular application without departing from the scope of the invention.

The belt 10 is assembled by slipping a roller onto each stub 26, 54 of adjacent modules 12, and intermeshing the trailing edge hinge members 32 of one of the modules 12 with the leading edge hinge members 30 of the adjacent module 12, such that the trailing hinge member openings 52 of the one module 12 are aligned with and the leading edge hinge member openings 38 of the other module 12. A hinge pin 40 is then slipped through the aligned hinge member openings 38, 52 to pivotally link the adjacent modules 12 together.

A module 12 having stubs 26,54 that support the roller 28 which rotates about a roller axis 58 of rotation that is offset above (i.e. toward the module top surface 24) the leading edge hinge pin axis 42 is preferred. However, in certain applications it is desirable to provide a module having stubs that support a roller which rotates about a roller axis of rotation that is offset above (shown in FIG. 3), offset below (shown in FIG. 4), and/or coaxial with (shown in FIG. 5), the leading edge hinge pin axis 42.

Figure 4:
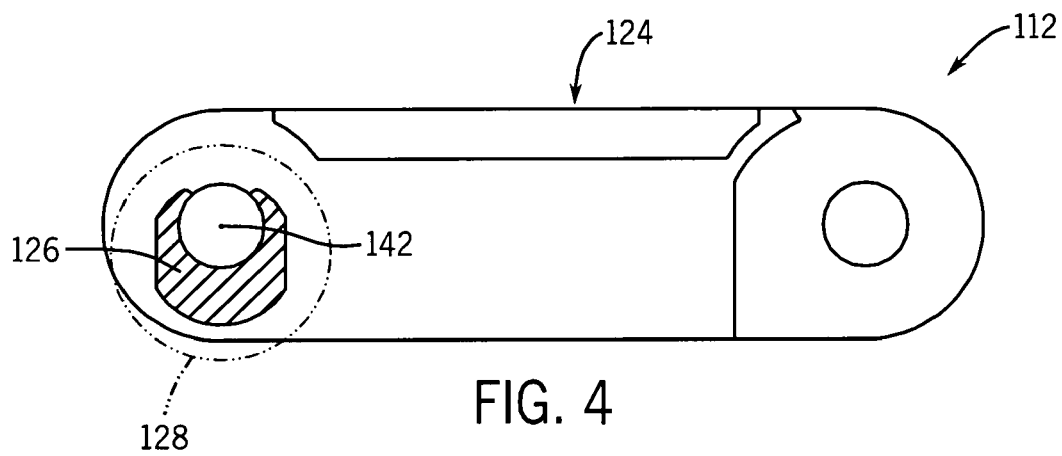
FIG. 4 is an elevational edge view of a module having a roller extending below the module which is suitable for use in the belt of FIG. 1.

As shown in FIG. 4, a module 112 incorporating the present invention includes a leading edge stub 126 that extends below the leading edge hinge pin axis 142. The stub 126 rotatably supports a roller 128 which rotates about a roller axis of rotation that is offset below (i.e. away from the module top surface 124) the leading edge hinge pin axis 142.

Advantageously, the roller 128 extends below the module 112 and is engageable with a supporting surface (not shown) to reduce friction between a belt including the module 112 and the supporting surface. Of course, the module 112 can include a trailing edge stub, such as described above, or which supports a roller having an axis of rotation below, or coaxial with, a trailing edge hinge pin axis.

Figure 5:
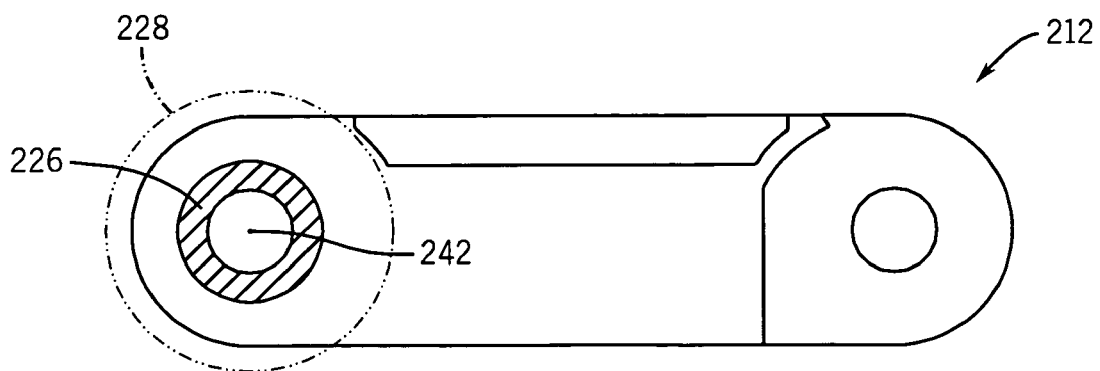
FIG. 5 is an elevational edge view of a module having a roller extending above and below the module which is suitable for use in the belt of FIG. 1.

As shown in FIG. 5, a module 212 incorporating the present invention includes a leading edge stub 226 that is coaxial with the leading edge hinge pin axis 242. The stub 226 rotatably supports a roller 228 which rotates about a roller axis of rotation that is coaxial with the leading edge hinge pin axis 242. The roller 228 is sized such that it extends above and below the module 212 and is engageable with a supporting surface (not shown) and an object (not shown) being conveyed. Advantageously, the supporting surface rotates the roller 228 to accelerate the object being conveyed. Of course, the module 212 can include a trailing edge stub, such as described above, or which supports a roller having an axis of rotation below, or coaxial with, a trailing edge hinge pin axis.

While there has been shown and described what are at present considered the preferred embodiments of the invention, it will be obvious to those skilled in the art that various changes and modifications can be made therein without departing from the scope of the invention defined by the appended claims.

What is claimed is:

1. A conveyor belt module for use in a modular conveying assembly, said module comprising:
   a body having a top surface defined by a leading edge and a trailing edge joined by side edges;
   a first hinge member extending forwardly from said body in a direction of conveyor travel and including a first opening defining a first space extending along an axis transverse to the direction of conveyor travel for receiving a first hinge pin;
   a second hinge member extending from said body in a direction opposite to the first hinge member and including a second opening defining a second space extending along an axis transverse to the direction of conveyor travel for receiving a second hinge pin;
   a stub extending from said first hinge member transverse to the direction of conveyor travel, and surrounding at least a portion of said first space for rotatably mounting a roller thereon for rotation around said first space; and
   a roller encircling said stub for rotation around said first space.

2. The conveyor belt module as in claim 1, in which said roller extends above the module.

3. The conveyor belt module as in claim 1, in which said roller extends below the module.

4. The conveyor belt module as in claim 1, in which said first hinge members extends forwardly from said leading edge, and said second hinge member extends rearwardly from said trailing edge.

5. The conveyor belt module as in claim 1 in which said top surface includes a notch for a portion of the roller extending therethrough above said top surface.

6. The conveyor belt module as in claim 1, in which said stub extends in a first transverse direction from said first hinge member, and second stub extends in a second transverse direction from said second hinge member, and said first transverse direction is opposite of said second transverse direction.

7. The conveyor belt module as in claim 1, in which said conveyor module includes at least one other first hinge member and at least one other second hinge member, said first other hinge member extending forwardly in the direction of conveyor travel and including an opening coaxial with said first opening and defining said first space extending along an axis transverse to the direction of conveyor travel for receiving the first hinge pin, and said second other hinge member extending forwardly in the direction of conveyor travel and including an opening coaxial with said second opening and defining said second space extending along an axis transverse to the direction of conveyor travel for receiving the second hinge pin.

8. A conveyor belt module for use in a modular conveying assembly, said module comprising:
   a first hinge member extending forwardly in a direction of conveyor travel and including a first opening defining a first space extending along an axis transverse to the direction of conveyor travel for receiving a first hinge pin;
   a second hinge member extending in a direction opposite to the first hinge member and including a second opening defining a second space extending along an axis transverse to the direction of conveyor travel for receiving a second hinge pin;
   a stub extending from said first hinge member transverse to the direction of conveyor travel, and surrounding at least a portion of said first space for rotatably mounting a roller thereon for rotation around said first space, said stub including a proximal end fixed to said first hinge member and a distal end; and
   a lip extending radially from said stub around at least a portion of said stub proximal said distal end to prevents the roller from slipping axially off of said stub.

9. A conveyor belt module for use in a modular conveying assembly, said module comprising:
   a first hinge member extending forwardly in a direction of conveyor travel and including a first opening defining a first space extending along an axis transverse to the direction of conveyor travel for receiving a first hinge pin;
   a second hinge member extending in a direction opposite to the first hinge member and including a second opening defining a second space extending along an axis transverse to the direction of conveyor travel for receiving a second hinge pin;
   a stub extending from said first hinge member transverse to the direction of conveyor travel, and surrounding at least a portion of said first space for rotatable mounting a roller thereon for rotation around said first space, wherein said first space defines a transverse axis which is coaxial with a hinge pin received in the space, and said roller rotates about an axis of rotation offset from said transverse axis.

10. The conveyor belt module as in claim 9, in which said conveyor module includes a top surface defined by a leading edge and a trailing edge joined by side edges, and said first hinge members extends forwardly from said leading edge, and said second hinge member extends rearwardly from said trailing edge, and said axis of rotation is offset towards said top surface.

11. The conveyor belt module as in claim 9, in which said conveyor module includes a top surface defined by a leading edge and a trailing edge joined by side edges, and said first hinge members extends forwardly from said leading edge, and said second hinge member extends rearwardly from said trailing edge, and said axis of rotation is offset away from said top surface.

12. A modular conveying assembly comprising:

a first conveyor module having a body including first hinge member extending from said body in a direction of conveyor travel, said first hinge member including a first opening, a second hinge member extending from said body in a direction opposite to the first hinge member and including a second opening, and a stub extending from said first hinge member transverse to the direction of conveyor travel;

a second conveyor module having a first hinge member extending in a direction of conveyor travel, said first hinge member including a first opening, a second hinge member extending in a direction opposite to the first hinge member and including a second opening, wherein said first opening of said first conveyor module is substantially aligned with said second opening of said second conveyor module, and said stub extending from said first hinge member of said first conveyor module extends toward said second hinge member of said second conveyor module;

a hinge pin extending through said first opening of said first conveyor module and said second opening of said second conveyor module, and said stub wrapping around at least a portion of said hinge pin; and a roller encircling said stub for rotation around said hinge pin.

13. The modular conveying assembly as in claim 12, in which said roller extends above the module.

14. The modular conveying assembly as in claim 12, in which said roller extends below the module.

15. The modular conveying assembly as in claim 12, in which said first conveyor module body includes a top surface defined by a leading edge and a trailing edge joined by side edges, and said first hinge members extends forwardly from said leading edge, and said second hinge member extends rearwardly from said trailing edge.

16. The modular conveying assembly as in claim 15, in which said top surface includes a notch for a portion of the roller extending therethrough above said top surface.

17. The modular conveying assembly as in claim 12, in which said stub extends in a first transverse direction from said first hinge member, and a second stub extends in a second transverse direction from said second hinge member, and said first transverse direction is opposite of said second transverse direction.

18. The modular conveying assembly as in claim 12, in which said first conveyor module includes at least one other first hinge member and at least one other second hinge member, said first other hinge member extending forwardly in the direction of conveyor travel and including an opening coaxial with said first opening, and said second other hinge member extending forwardly in the direction of conveyor travel and including an opening coaxial with said second opening.

19. The modular conveying assembly as in claim 12, in which said stub includes a proximal end fixed to said first hinge member and a distal end, and a lip extending radially from said stub around at least a portion of said stub proximal said distal end prevents the roller from slipping axially off of said stub.

20. The modular conveying assembly as in claim 12, in which said hinge pin defines a transverse axis, and said roller rotates about an axis of rotation offset from said transverse axis.

21. The modular conveying assembly as in claim 12, in which said conveyor module includes a top surface defined by a leading edge and a trailing edge joined by side edges, and said first hinge members extends forwardly from said leading edge, and said second hinge member extends rearwardly from said trailing edge, and said axis of rotation is offset towards said top surface.

* * * * *

UNITED STATES PATENT AND TRADEMARK OFFICE
CERTIFICATE OF CORRECTION

PATENT NO. : 6,932,211 B2
DATED : August 23, 2005
INVENTOR(S) : Wieting et al.

It is certified that error appears in the above-identified patent and that said Letters Patent is hereby corrected as shown below:

Column 6,
Line 47, "rotatable" is changed to -- rotatably --.

Signed and Sealed this

Twenty-seventh Day of December, 2005

JON W. DUDAS
*Director of the United States Patent and Trademark Office*